(12) United States Patent
Yang et al.

(10) Patent No.: US 12,474,013 B2
(45) Date of Patent: Nov. 18, 2025

(54) COMMUNICATION APPARATUS AND BRACKET STRUCTURE THEREOF

(71) Applicant: Wistron NeWeb Corp., Hsinchu (TW)

(72) Inventors: Lan-Chun Yang, Hsinchu (TW); Chun-Wei Wang, Hsinchu (TW); Bo-Yen Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 11 days.

(21) Appl. No.: 18/531,913

(22) Filed: Dec. 7, 2023

(65) Prior Publication Data
US 2024/0230019 A1    Jul. 11, 2024

(30) Foreign Application Priority Data
Jan. 9, 2023 (TW) .................................. 112100836

(51) Int. Cl.
*F16M 11/10* (2006.01)
*H01Q 1/12* (2006.01)

(52) U.S. Cl.
CPC ............ *F16M 11/10* (2013.01); *H01Q 1/1228* (2013.01)

(58) Field of Classification Search
CPC ...... F16M 11/10; H01Q 1/1228; H01Q 1/125; H01Q 1/1221
USPC .................................................. 343/880, 882
See application file for complete search history.

(56) References Cited

U.S. PATENT DOCUMENTS

| | | | | |
|---|---|---|---|---|
| 3,505,515 A * | 4/1970 | Adra | ........................ | F21V 21/30 362/371 |
| 3,510,877 A * | 5/1970 | Turriere | .................... | H01Q 3/02 343/765 |
| 4,148,164 A * | 4/1979 | Humphrey | ............ | E04D 13/158 52/712 |
| 4,410,933 A * | 10/1983 | Blake | ...................... | F16M 11/10 362/427 |
| 5,977,922 A * | 11/1999 | Hemmingsen | ......... | H01Q 1/125 33/270 |
| 6,075,499 A * | 6/2000 | Edwards | ................. | H01Q 1/125 455/562.1 |
| 6,407,713 B1 * | 6/2002 | Mallenius | .............. | F16M 11/12 343/890 |

(Continued)

FOREIGN PATENT DOCUMENTS

CN             112747225 A *    5/2021 ................ F16B 2/08

*Primary Examiner* — Taylor Morris
(74) *Attorney, Agent, or Firm* — McClure, Qualey & Rodack, LLP (57) ABSTRACT

A communication apparatus is provided. The communication apparatus includes a communication device and a bracket structure. The communication device includes a device housing and a connection unit, wherein the device housing includes a housing surface, and the connection unit is disposed on the housing surface. The communication device is connected to the bracket structure. The bracket structure includes a first bracket and a second bracket. The first bracket is rotatably connected to the connection unit, wherein the communication device is adapted to be rotated around a first axis relative to the first bracket, and the first axis is perpendicular to the housing surface. The second bracket is rotatably connected to the first bracket, wherein the first bracket is adapted to be rotated around the second axis relative to the second bracket, and the second axis is perpendicular to the first axis.

12 Claims, 6 Drawing Sheets

(56) References Cited

U.S. PATENT DOCUMENTS

| | | | | |
|---|---|---|---|---|
| 6,445,361 | B2 * | 9/2002 | Liu | H01Q 1/125 343/882 |
| 6,484,987 | B2 * | 11/2002 | Weaver | F16M 11/2028 248/278.1 |
| 6,762,790 | B1 * | 7/2004 | Matko | F16M 11/10 396/428 |
| 7,583,239 | B2 * | 9/2009 | Okubo | H01Q 1/125 343/882 |
| 7,883,065 | B2 * | 2/2011 | Nelson | F16M 11/2021 248/70 |
| 7,918,054 | B2 * | 4/2011 | Grafton | E04D 3/3608 248/300 |
| 8,052,107 | B2 * | 11/2011 | Yang | H01Q 1/1264 343/882 |
| 8,534,622 | B2 * | 9/2013 | Vanover | H01Q 1/1207 211/171 |
| 8,794,578 | B2 * | 8/2014 | Lin | H01Q 1/125 343/890 |
| 8,960,976 | B2 * | 2/2015 | Georgitsis | F21V 21/30 362/426 |
| 9,172,137 | B2 * | 10/2015 | Lee | H01Q 3/06 |
| 9,184,489 | B2 * | 11/2015 | Lin | H01Q 1/1264 |
| 9,634,373 | B2 * | 4/2017 | Lee | H01Q 19/022 |
| 9,966,649 | B2 * | 5/2018 | Christie | H01Q 1/125 |
| 10,096,885 | B2 * | 10/2018 | Renilson | F16B 5/0225 |
| 10,340,579 | B2 * | 7/2019 | Tsukada | H01Q 1/125 |
| 10,797,380 | B2 * | 10/2020 | Roy | H01Q 1/1228 |
| 10,801,664 | B1 * | 10/2020 | Nighswander | F16M 13/005 |
| 11,909,094 | B2 * | 2/2024 | Yoo | H01Q 3/08 |
| 2002/0179784 | A1 * | 12/2002 | Mehta | F16M 11/10 248/129 |
| 2005/0264467 | A1 | 12/2005 | Lin et al. | |
| 2007/0177064 | A1 * | 8/2007 | Lin | H01Q 3/04 348/838 |
| 2020/0185811 | A1 | 6/2020 | Willemsen et al. | |
| 2021/0014987 | A1 * | 1/2021 | Moosburger | F16M 13/02 |
| 2021/0226314 | A1 | 7/2021 | Kolokotronis | |
| 2022/0037758 | A1 * | 2/2022 | Kim | F16M 13/02 |
| 2022/0243867 | A1 * | 8/2022 | Tsorng | H01Q 1/1228 |
| 2024/0093829 | A1 * | 3/2024 | Tsorng | G09F 7/18 |

* cited by examiner

COMMUNICATION APPARATUS AND BRACKET STRUCTURE THEREOF

CROSS REFERENCE TO RELATED APPLICATIONS

This Application claims priority of Taiwan patent Application No. 112100836, filed on Jan. 9, 2023, the entirety of which is incorporated by reference herein.

BACKGROUND OF THE INVENTION

Field of the Invention

The present invention relates to a bracket structure, and, in particular, to a bracket structure utilized in a communication apparatus.

Description of the Related Art

Conventionally, communication devices (such as a wireless router) are affixed to bracket structures when they are installed in a building. These communication devices transmit wireless signals to the outdoor base station. Conventional bracket structures have limited freedom, and the adjustment angle of the communication device is thus restricted. With the popularity of 5G technology, 5G communication devices cannot obtain adequate wireless signal transmission in urban environments full of tall buildings. The conventional bracket structures cannot satisfy the orientation adjustment requirement of the communication device.

BRIEF SUMMARY OF THE INVENTION

An embodiment of the present invention provides a communication apparatus. The communication apparatus includes a communication device and a bracket structure. The communication device includes a device housing and a connection unit, wherein the device housing includes a housing surface, and the connection unit is disposed on the housing surface. The communication device is connected to the bracket structure. The bracket structure includes a first bracket and a second bracket. The first bracket is rotatably connected to the connection unit, wherein the communication device is adapted to be rotated around a first axis relative to the first bracket, and the first axis is perpendicular to the housing surface. The second bracket is rotatably connected to the first bracket, wherein the first bracket is adapted to be rotated around a second axis relative to the second bracket, and the second axis is perpendicular to the first axis.

In one embodiment, the connection unit comprises a joint element, the first bracket comprises a first slot, and the joint element passes through the slot and is adapted to slide along the first slot.

In one embodiment, the bracket structure further comprises a plurality of fasteners, the first bracket comprises a plurality of fastening portions, the device housing comprises a plurality of fastening holes, and each fastener passes through the corresponding fastening portion and connects the corresponding fastening hole to affix the communication device to the first bracket.

In one embodiment, the first bracket further comprises an insertion slot, the insertion slot communicates with the first slot, and the joint element is adapted to enter the first slot via the insertion slot.

In one embodiment, the first bracket further comprises a stopper, the stopper corresponds to the insertion slot, the joint element is adapted to be stopped by the stopper in the first direction, the joint element is adapted to be moved from the insertion slot to the first slot in the second direction, and the first direction is perpendicular to the second direction.

In one embodiment, the insertion slot comprises an insertion area and a connection area, the connection area connects the insertion area and the first slot, the stopper corresponds to the insertion area, and the width of the connection area is tapered in the second direction.

In one embodiment, the communication device comprises a first angle mark, the first bracket further comprises a first indicator, the first indicator corresponds to the first angle mark, and the first indicator is formed on the stopper.

In one embodiment, the bracket structure further comprises at least one pivot member, the first bracket comprises two first flanks, the second bracket comprises two second flanks, and the pivot member pivots on the first flank and the second flank.

In one embodiment, the bracket structure further comprises a fastening unit, each second flank comprises a second slot, the fastening unit is affixed to the first flanks and the second flanks, and the fastening unit is adapted to slide in the second slots.

In one embodiment, the second bracket comprises a second angle mark, the first bracket further comprises a second indicator, the second indicator corresponds to the second angle mark, and the second indicator is formed on at least one of the first flanks.

In one embodiment, the bracket structure further comprises a binding tie, the binding tie is adapted to be telescoped on a pillar, the binding tie is connected to the second bracket, the second bracket is adapted to be rotated around a third axis relative to the pillar, the third axis is perpendicular to the second axis, and the third axis is perpendicular to the first axis.

In one embodiment, the second bracket comprises a V-shaped recess, and the pillar abuts the V-shaped recess.

In another embodiment, a bracket structure is provided. The bracket structure is adapted to be connected to a device. The bracket structure includes a first bracket and a second bracket. The first bracket is rotatably connected to the device, wherein the device is adapted to be rotated around the first axis relative to the first bracket, and the first axis is perpendicular to a housing surface of the device. The second bracket is rotatably connected to the first bracket, wherein the first bracket is adapted to be rotated around the second axis relative to the second bracket, and the second axis is perpendicular to the first axis.

The bracket structure of the embodiment of the invention provides multiple rotational freedoms. The orientation of the communication device (such as a wireless router) can be adjusted to obtain improves wireless signal transmission. For example, when the communication device (such as a wireless router) is mounted on the high floor of the building and the base station is disposed on the road, the orientation of the communication device can be adjusted, and the communication device can face the base station to obtain improves wireless signal transmission.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
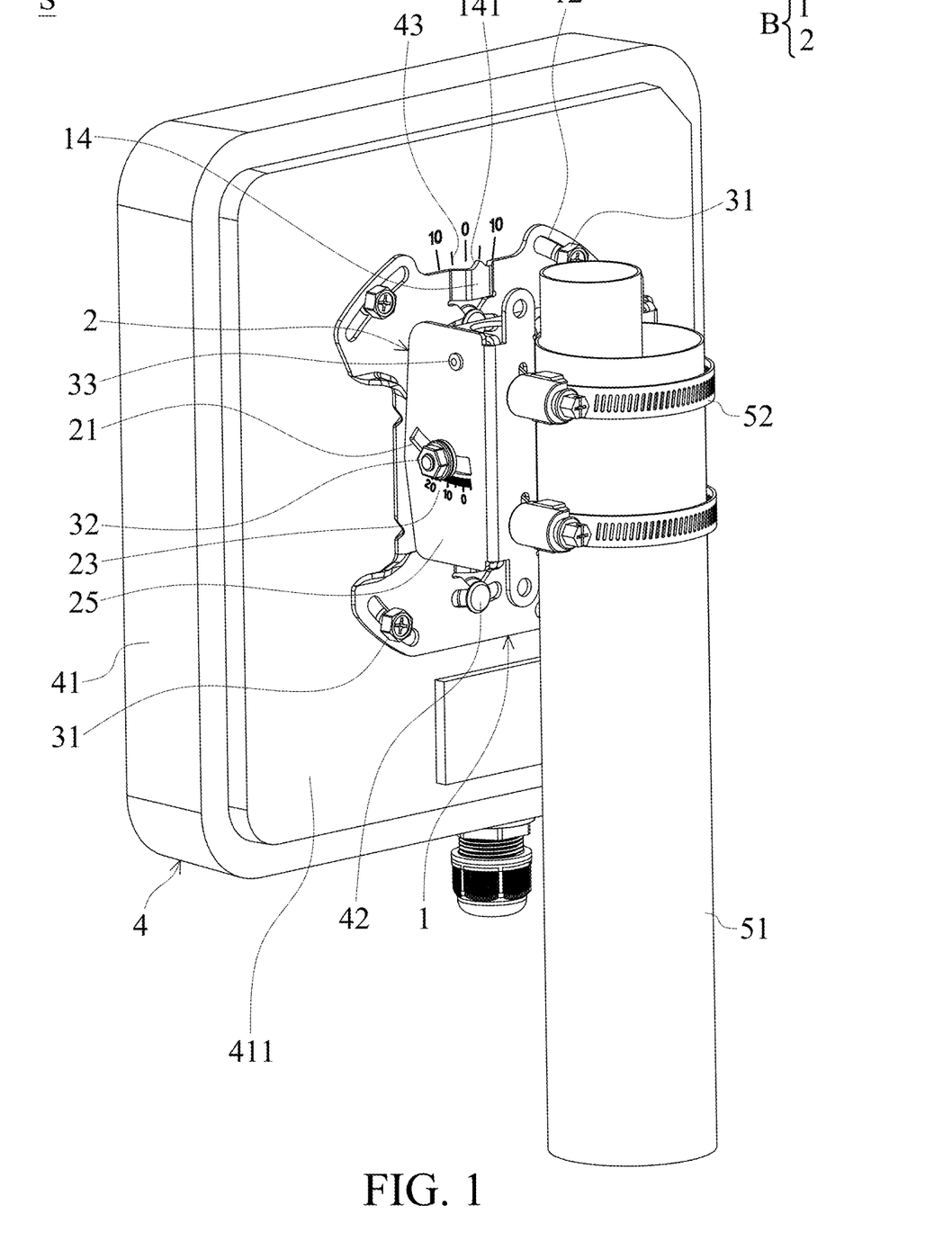
FIG. 1 is a perspective view of a communication apparatus of the embodiment of the invention.
Figure 2:
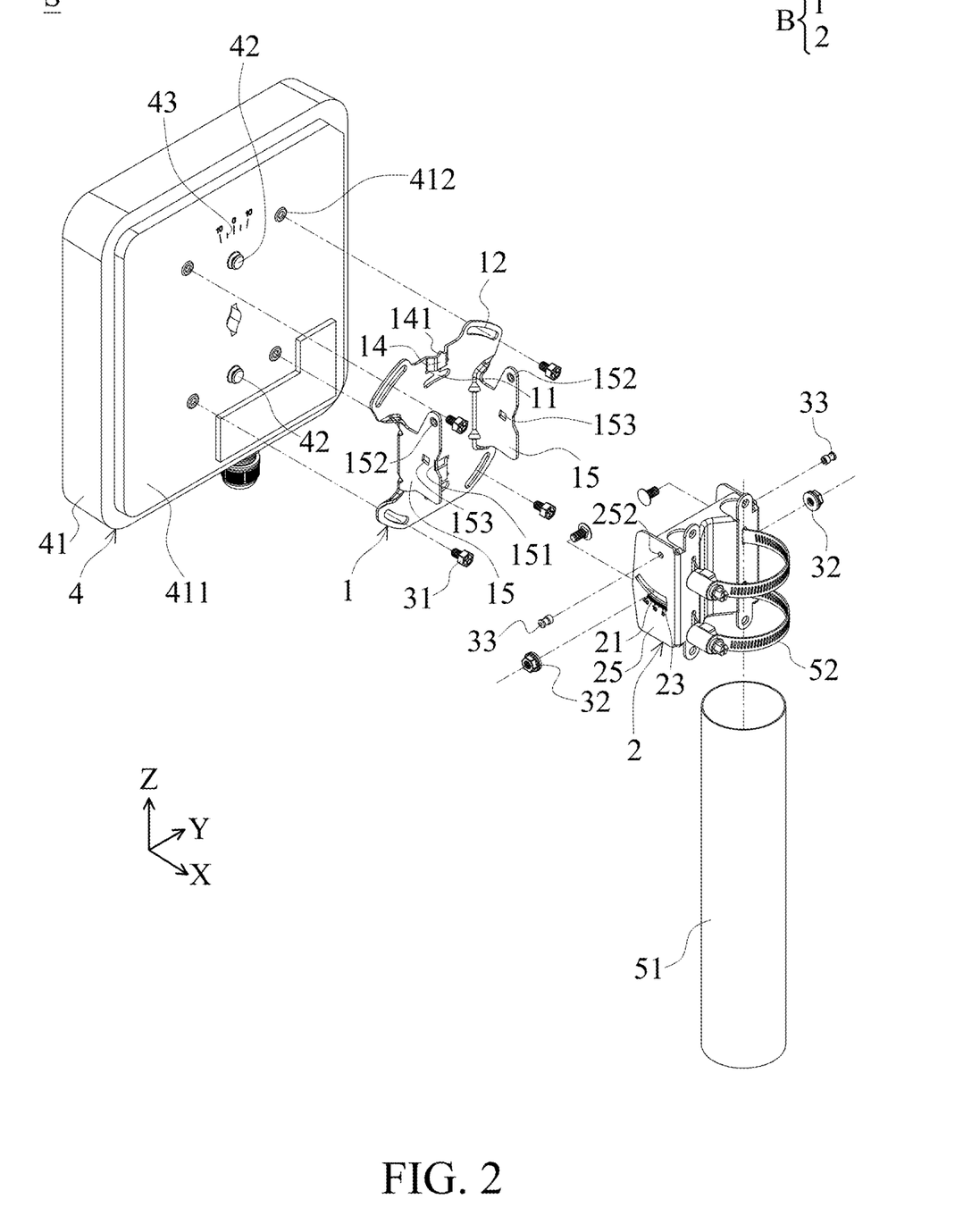
FIG. 2 is an exploded view of the communication apparatus of the embodiment of the invention.

FIG. 1 is a perspective view of a communication apparatus of the embodiment of the invention. FIG. 2 is an exploded view of the communication apparatus of the embodiment of the invention. With reference to FIGS. 1 and 2, the communication apparatus S of the embodiment of the invention includes a communication device 4 and a bracket structure B. The communication device 4 includes a device housing 41 and a connection unit 42. The device housing 41 includes a housing surface 411. The connection unit 42 is disposed on the housing surface 411. The communication device 4 is connected to the bracket structure B. The bracket structure B includes a first bracket 1 and a second bracket 2. The first bracket 1 is rotatably connected to the connection unit 42. The communication device 4 is adapted to be rotated around the first axis X relative to the first bracket 1. The first axis X is perpendicular to the housing surface 411. The second bracket 2 is rotatably connected to the first bracket 1. The first bracket 1 is adapted to be rotated around a second axis Y relative to the second bracket 2. The second axis Y is perpendicular to the first axis X.

With reference to FIGS. 1 and 2, in one embodiment, the connection unit 42 comprises two joint elements (42). The first bracket 1 comprises two first slots 11. The joint elements (42) pass through the slots 11 and are adapted to slide along the first slots 11.

With reference to FIGS. 1 and 2, in one embodiment, the bracket structure B further comprises a plurality of fasteners 31. The first bracket 1 comprises a plurality of fastening portions 12. The device housing 41 comprises a plurality of fastening holes 412. Each fastener 31 passes through the corresponding fastening portion 12 and connects the corresponding fastening hole 412 to affix the communication device 4 to the first bracket 1. In one embodiment, there are four fastening portions 12, and the fastening portions 12 are arranged symmetrically. The disclosure is not meant to restrict the invention.

Figure 3A:
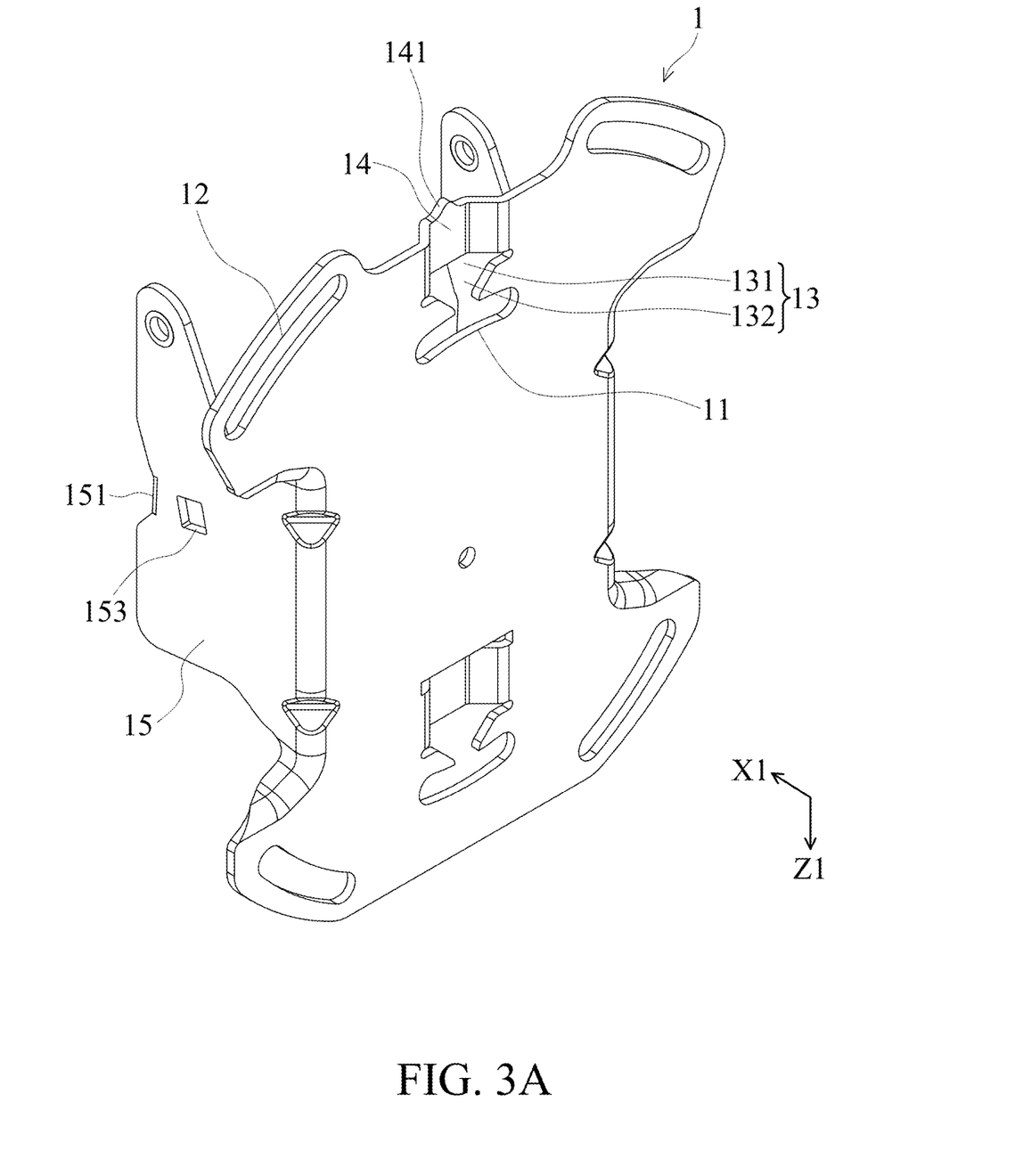
FIG. 3A shows the details of the first bracket of the embodiment of the invention.

FIG. 3A shows the details of the first bracket of the embodiment of the invention. With reference to FIGS. 1, 2 and 3A, in one embodiment, the first bracket 1 further comprises an insertion slot 13. The insertion slot 13 communicates with the first slot 11. The joint element (42) is adapted to enter the first slot 11 via the insertion slot 13.

With reference to FIGS. 1, 2 and 3A, in one embodiment, the first bracket 1 further comprises a stopper 14. The stopper 14 corresponds to the insertion slot 13. The joint element (42) is adapted to be stopped by the stopper 14 in the first direction X1. The joint element (42) is adapted to be moved from the insertion slot 13 to the first slot 11 in the second direction Z1. The first direction X1 is perpendicular to the second direction Z1.

With reference to FIGS. 1, 2 and 3A, in one embodiment, the insertion slot 13 comprises an insertion area 131 and a connection area 132. The connection area 132 connects the insertion area 131 and the first slot 11. The stopper 14 corresponds to the insertion area 131. The width of the connection area 132 is tapered in the second direction Z1.

With reference to FIGS. 1, 2 and 3A, in one embodiment, the communication device 4 comprises a first angle mark 43. The first bracket 1 further comprises a first indicator 141. The first indicator 141 corresponds to the first angle mark 43. The first indicator 141 is formed on the stopper 14.

With reference to FIGS. 1 and 2, in one embodiment, the bracket structure B further comprises at least one pivot member 33. The first bracket 1 comprises two first flanks 15. The second bracket 2 comprises two second flanks 25. Each first flank 15 overlaps the corresponding second flank 25. The pivot member 33 pivots on the first flank 15 and the second flank 25. In one embodiment, each first flank 15 includes a first connection hole 152. Each second flank 25 includes a second connection hole 252. The pivot member 33 is connected to the first connection hole 152 and the second connection hole 252.

Figure 3B:
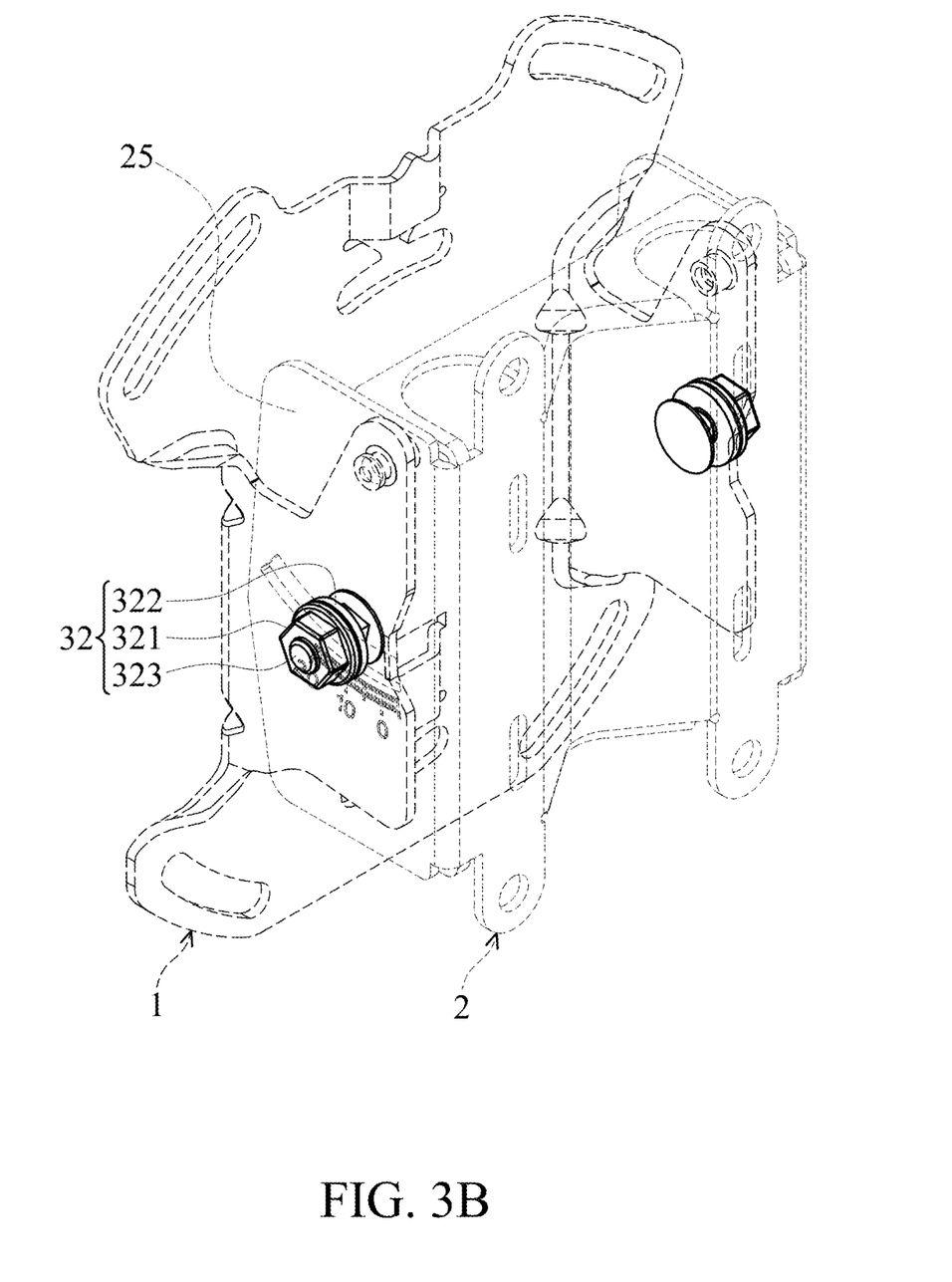
FIG. 3B shows the details of a fastening unit of the embodiment of the invention.

FIG. 3B shows the details of a fastening unit of the embodiment of the invention. With reference to FIGS. 1, 2 and 3B, in one embodiment, the bracket B structure further comprises a fastening unit 32. Each second flank 25 comprises a second slot 21. The fastening unit 32 is affixed to the first flanks 15 and the second flanks 25. Under an adjustment state, the fastening unit 32 is adapted to slide in the second slots 21. Particularly, in one embodiment, each first flank 15 includes a fastening hole (square hole) 153. Each fastening unit 32 includes a nut 321, a washer 322 and a square-head bolt 323. The square-head bolt 323 is connected to the fastening hole (square hole) 153. The nut 321 is connected to the square-head bolt 323 to tightly fit the washer 322 and the second flank 25.

With reference to FIGS. 1 and 2, in one embodiment, the second bracket 2 comprises a second angle mark 23. The first bracket 1 further comprises a second indicator 151. The second indicator 151 corresponds to the second angle mark 23. The second indicator 151 is formed on at least one of the first flanks 15.

With reference to FIGS. 1 and 2, in one embodiment, the bracket structure B further comprises a binding tie 52. The binding tie 52 is adapted to be telescoped on a pillar 51. The binding tie 52 is connected to the second bracket 2. The second bracket 2 is adapted to be rotated around a third axis Z relative to the pillar 51. The third axis Z is perpendicular to the second axis Y. The third axis Z is perpendicular to the first axis X.

Figure 4:
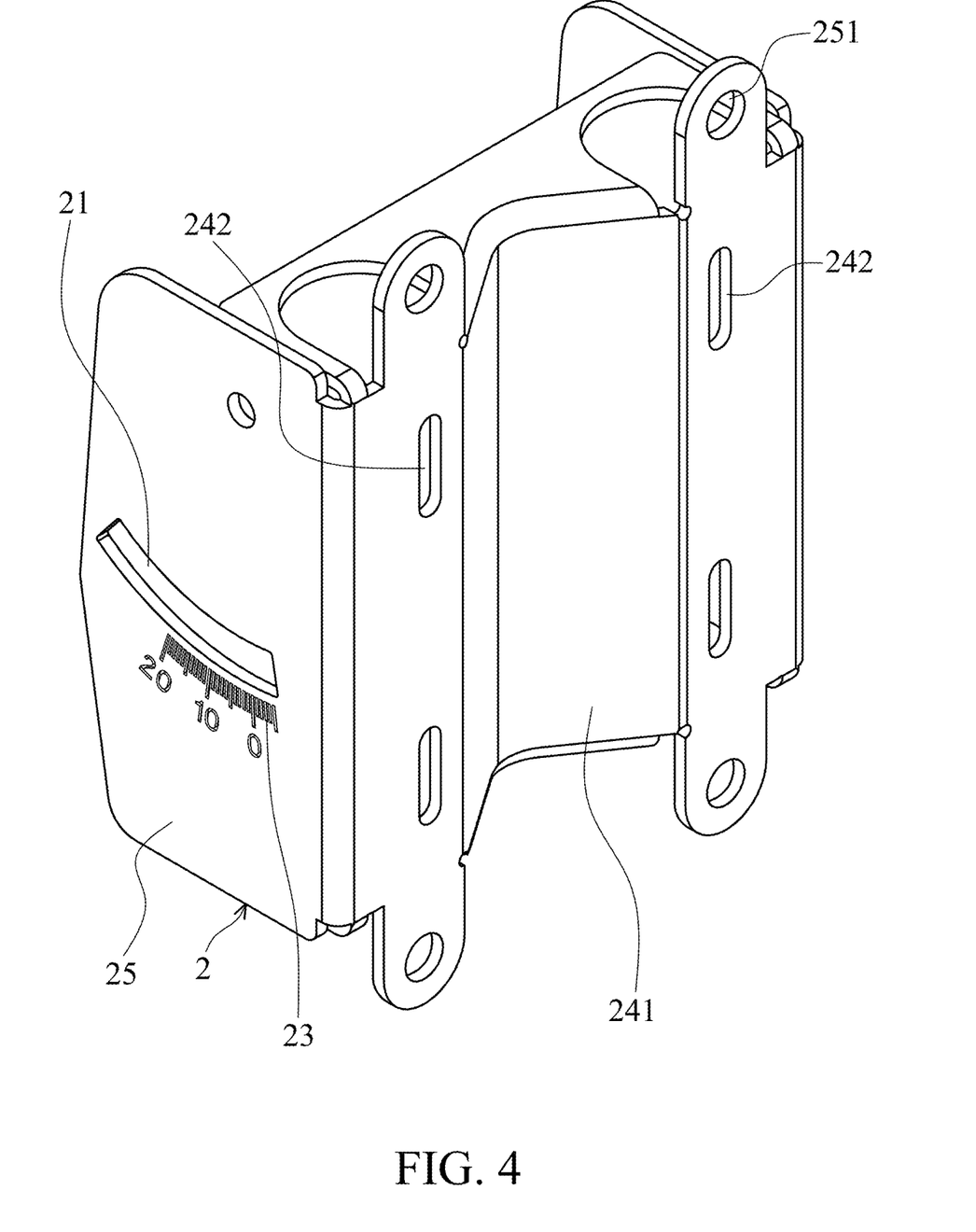
FIG. 4 shows the details of the second bracket of the embodiment of the invention.

FIG. 4 shows the details of the second bracket of the embodiment of the invention. With reference to FIGS. 1, 2 and 4 in one embodiment, the second bracket 2 comprises a V-shaped recess 241, and the pillar 51 abuts the V-shaped recess 241. In this embodiment, the second bracket 2 further comprises through holes 242, and the binding tie 52 is adapted to pass through the through holes 242.

Figure 5:
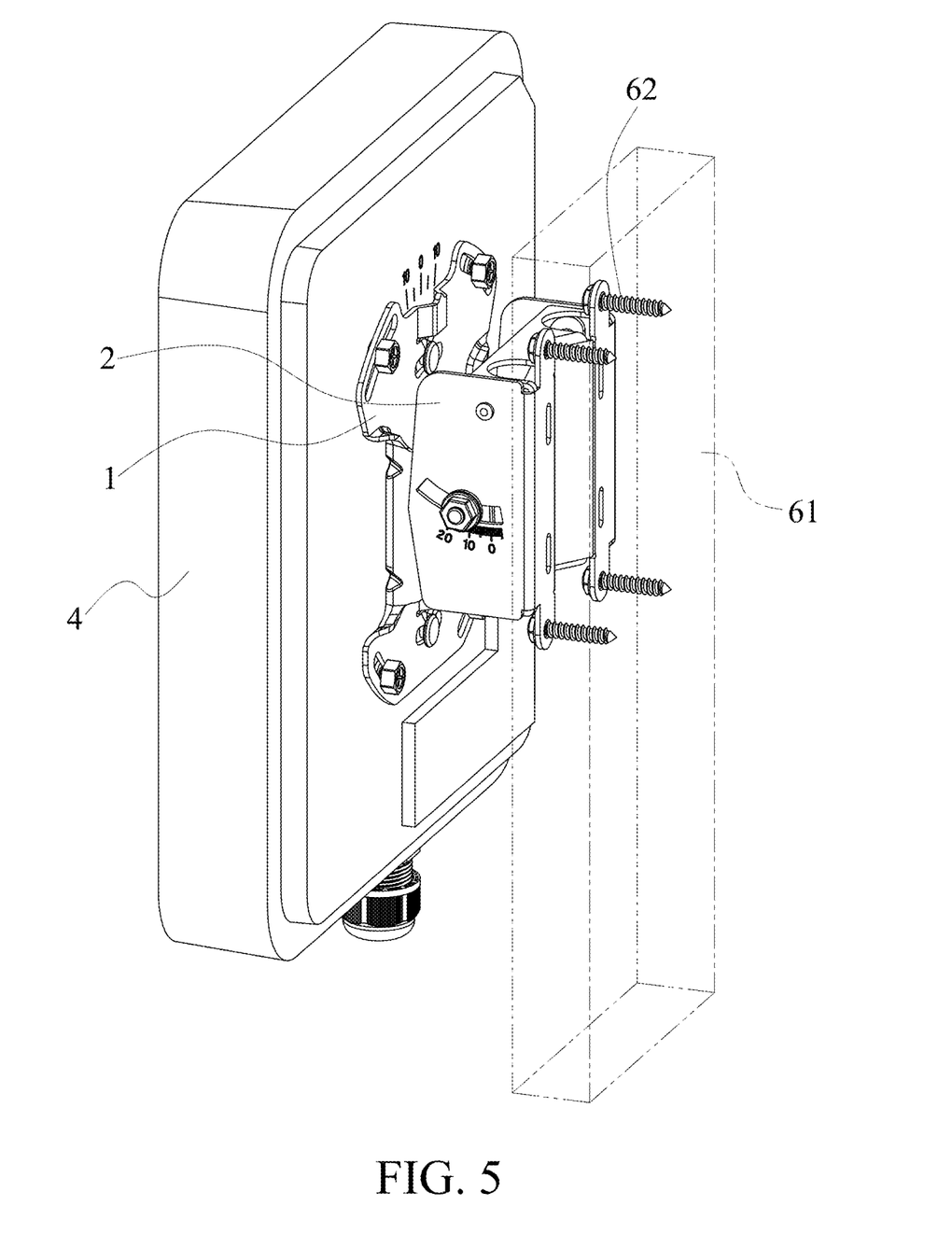
FIG. 5 shows a communication apparatus of another embodiment of the invention.

FIG. 5 shows a communication apparatus of another embodiment of the invention. With reference to FIG. 5, in this embodiment, the pillar 51 and the binding tie 52 are omitted. The second bracket 2 is directly affixed to a fastening surface 61 by bolts 62. With reference to FIGS. 4 and 5, in one embodiment, the second bracket 2 further comprises through holes 251. The bolts 62 pass through the through holes 251 to connect the second bracket 2 to the fastening surface 61.

The bracket structure of the embodiment of the invention provides multiple rotational freedoms. The orientation of the communication device (such as a wireless router) can be adjusted to obtain improves wireless signal transmission. For example, when the communication device (such as a wireless router) is mounted on the high floor of the building and the base station is disposed on the road, the orientation of the communication device can be adjusted, and the communication device can face the base station to obtain improves wireless signal transmission.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication apparatus, comprising:
   a communication device, comprising a device housing and a connection unit, wherein the device housing comprises a housing surface, and the connection unit is disposed on the housing surface; and
   a bracket structure, wherein the communication device is connected to the bracket structure, and the bracket structure comprises:
   a first bracket, rotatably connected to the connection unit, wherein the communication device is adapted to be rotated around a first axis relative to the first bracket, and the first axis is perpendicular to the housing surface; and
   a second bracket, rotatably connected to the first bracket, wherein the first bracket is adapted to be rotated around a second axis relative to the second bracket, and the second axis is perpendicular to the first axis,
   wherein the connection unit comprises a joint element, the first bracket comprises a first slot, and the joint element passes through the slot and is adapted to slide along the first slot,
   wherein the first bracket further comprises an insertion slot, the insertion slot communicates with the first slot, and the joint element is adapted to enter the first slot via the insertion slot,
   wherein the first bracket further comprises a stopper, the stopper corresponds to the insertion slot, and when the joint element has been inserted into the insertion slot, the joint element is adapted to be stopped by the stopper in a first direction, the joint element is adapted to be moved from the insertion slot to the first slot in a second direction, and the first direction is perpendicular to the second direction,
   wherein the bracket structure further comprises a plurality of fasteners, the first bracket comprises a plurality of fastening portions, the device housing comprises a plurality of fastening holes, and each fastener passes through the corresponding fastening portion and connects the corresponding fastening hole to affix the communication device to the first bracket,
   wherein the insertion slot comprises an insertion area and a connection area, the connection area connects the insertion area and the first slot, the stopper corresponds to the insertion area, and a width of the connection area is tapered in the second direction.

2. The communication apparatus as claimed in claim 1, wherein the communication device comprises a first angle mark, the first bracket further comprises a first indicator, the first indicator corresponds to the first angle mark, and the first indicator is formed on the stopper.

3. The communication apparatus as claimed in claim 1, wherein the bracket structure further comprises at least one pivot member, the first bracket comprises two first flanks, the second bracket comprises two second flanks, and the pivot member pivots on the first flank and the second flank.

4. The communication apparatus as claimed in claim 3, wherein the bracket structure further comprises a fastening unit, each second flank comprises a second slot, the fastening unit is affixed to the first flanks and the second flanks, and the fastening unit is adapted to slide in the second slots.

5. The communication apparatus as claimed in claim 4, wherein the second bracket comprises a second angle mark, the first bracket further comprises a second indicator, the second indicator corresponds to the second angle mark, and the second indicator is formed on at least one of the first flanks.

6. The communication apparatus as claimed in claim 1, wherein the bracket structure further comprises a binding tie, the binding tie is adapted to be telescoped on a pillar, the binding tie is connected to the second bracket, the second bracket is adapted to be rotated around a third axis relative to the pillar, the third axis is perpendicular to the second axis, and the third axis is perpendicular to the first axis.

7. The communication apparatus as claimed in claim 6, wherein the second bracket comprises a V-shaped recess, and the pillar abuts the V-shaped recess.

8. A bracket structure, adapted to be connected to a device, comprising:
   a first bracket, wherein a first slot, an insertion slot and a stopper are formed on the first bracket, the insertion slot is communicated with the first slot, the insertion slot comprises an insertion are and a connection area, the connection area connects the insertion area and the first slot, the stopper corresponds to the insertion area, and the stopper is located behind a plane where the insertion slot is formed;
   a second bracket, rotatably connected to the first bracket, wherein the first bracket is adapted to be rotated around a second axis relative to the second bracket, and the second axis is perpendicular to the first axis; and
   a binding tie, wherein the binding tie is adapted to be telescoped on a pillar, the binding tie is connected to the second bracket, the second bracket is adapted to be rotated around a third axis relative to the pillar, the third axis is perpendicular to the second axis, and the third axis is perpendicular to the first axis.

9. The bracket structure as claimed in claim 8, further comprising a plurality of fasteners, wherein the first bracket comprises a plurality of fastening portions, each fastener passes through the corresponding fastening portion.

10. The bracket structure as claimed in claim 8, further comprising at least one pivot member, wherein the first bracket comprises two first flanks, the second bracket comprises two second flanks, and the pivot member pivots on the first flank and the second flank.

11. The bracket structure as claimed in claim 10, further comprising a fastening unit, wherein each second flank comprises a second slot, the fastening unit is affixed to the first flanks and the second flanks, and the fastening unit is adapted to slide in the second slots.

12. The bracket structure as claimed in claim 8, wherein the second bracket further comprises a plurality of through holes, and a plurality of bolts are adapted to pass through the through holes to affix the second bracket to a fastening surface.

\* \* \* \* \*